(12) United States Patent
Seck

(10) Patent No.: US 7,247,284 B1
(45) Date of Patent: Jul. 24, 2007

(54) METHOD AND APPARATUS FOR REGENERATION OF FLUE GAS SCRUBBER CAUSTIC SOLUTIONS

(76) Inventor: Karl A. Seck, 3190 Bay Rd., Ferndale, WA (US) 98248

( * ) Notice: Subject to any disclaimer, the term of this patent is extended or adjusted under 35 U.S.C. 154(b) by 393 days.

(21) Appl. No.: 11/066,857

(22) Filed: Feb. 24, 2005

Related U.S. Application Data

(60) Provisional application No. 60/546,927, filed on Feb. 24, 2004.

(51) Int. Cl.
B01D 53/50 (2006.01)
C01D 1/00 (2006.01)
C01F 11/46 (2006.01)

(52) U.S. Cl. .............. 423/182; 423/183; 423/243.01; 423/243.08; 423/555; 23/304

(58) Field of Classification Search .............. 423/182, 423/183, 243.01, 243.08, 555; 23/304
See application file for complete search history.

(56) References Cited

U.S. PATENT DOCUMENTS

| | | | | |
|---|---|---|---|---|
| 2,970,890 | A | * | 2/1961 | James .......................... 423/183 |
| 3,873,532 | A | | 3/1975 | Dahlstrom et al. |
| 3,944,649 | A | | 3/1976 | Field et al. |
| 4,021,202 | A | | 5/1977 | Field et al. |
| 4,216,189 | A | * | 8/1980 | Nicholson et al. ..... 423/243.09 |
| 4,804,523 | A | * | 2/1989 | Abrams et al. ......... 423/243.08 |
| 5,266,287 | A | * | 11/1993 | Johnson ................. 423/243.08 |
| 6,086,842 | A | * | 7/2000 | Kim et al. ................... 423/511 |
| 6,217,839 | B1 | * | 4/2001 | Hess et al. ............. 423/243.01 |
| 7,179,437 | B2 | * | 2/2007 | Westerberg et al. ........ 423/165 |

* cited by examiner

Primary Examiner—Timothy C. Vanoy
(74) Attorney, Agent, or Firm—Todd N. Hathaway

(57) ABSTRACT

A process to regenerate wet flue gas scrubber purge liquid into NaOH caustic suitable for make-up caustic for the scrubber is disclosed. Further, sulfur is removed from waste effluent in the form of gypsum with the process described herein. Lime is added to the spent, sodium sulfate-containing purge liquid to result in the formation of gypsum and sodium hydroxide.

17 Claims, 1 Drawing Sheet

METHOD AND APPARATUS FOR REGENERATION OF FLUE GAS SCRUBBER CAUSTIC SOLUTIONS

RELATED APPLICATIONS

This application claims the benefit of U.S. Provisional Patent Application No. 60/546,927 filed on 24 Feb. 2004.

BACKGROUND OF THE INVENTION a. Field of the Invention

This invention relates generally to wet flue gas scrubbers, and, more particularly, to a method and apparatus for regenerating flue gas scrubber purge solution into NaOH caustic while removing sulfur containing waste from the plant effluent.

b. Background

Responding to environmental regulations, many oil refiners are currently operating or installing wet flue gas scrubbers to remove SO2 and/or particulates from various waste gas streams. Scrubbers can be used on various refinery processes including coke calciners, Phillips SZorb process, and Fluidized Catalytic Crackers (FCC). Most notably wet flue gas scrubbers (FGS) are used on the regenerator stack of a FCC to remove SO2 and particulates from the combustion gas before expelling it to the atmosphere. To efficiently remove the SO2, caustic soda (or "caustic", NaOH) must be added to the circulating aqueous solution to control pH in the neutral to slightly basic range. Some portion of the circulating solution must be purged to maintain SO2 removal and control solids content of the solution.

The purge stream is generally further treated in a purge treatment unit (PTU) to remove solids and reduce the chemical oxygen demand (COD) of the solution. After this stage of treatment the liquid effluent is discharged through a waste water treatment plant out the process plant effluent discharge usually into a body of water. The predominate salt in the PTU effluent is sodium sulfate (NaSO4), currently considered benign in salt water effluent zones but of more concern in fresh water or brackish effluent zones. Legal action has been taken against refiners in Illinois and Delaware to mitigate salt in or anticipated to be in refinery effluent due to a FGS operation.

Make-up caustic for the FGS is purchased and shipped into the refinery by truck or railcar. Regenerating the purge from a FGS would greatly reduce caustic purchases. Most caustic is manufactured by an electrolysis separation of NaCl, an electricity intensive process. Recycling caustic will save electricity and benefit the environment versus manufacturing fresh caustic for FGS operations.

Paramount Limited's (India) Double Alkali system uses lime to partially regenerate a caustic-based scrubber purge so that it can be recirculated to the scrubber. However, this process requires a very large purge that would be problematic when dealing with a PTU to remove suspended solids such as from an FCC scrubber. In the double alkali system, calcium sulfite is a produced solid along with calcium sulfate (gypsum) reducing the value of the recovered solid and making settling and filtering more difficult.

Lime or limestone is commonly used in power plants to remove SO2 from flue gas. Direct lime scrubbers are difficult to operate since lime is not very soluble in water and must be circulated in the scrubber as a slurry unlike the easier to operate caustic FGS. Like the process in this invention, the sulfur is removed by a lime scrubber as CaSO4 or gypsum. The gypsum from power plant scrubbers is increasingly being sold into the synthetic gypsum market and used for wall board or portland cement manufacturing. It is anticipated that gypsum made by applying the present invention will be suitable for use as synthetic gypsum.

SUMMARY OF THE INVENTION

Regeneration of the sodium sulfate solution is accomplished by mixing the solution with lime slurry in a reactor/crystallizer where the following reaction takes place:

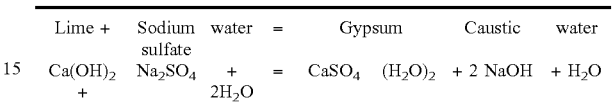

| Lime + | Sodium sulfate | water | = | Gypsum | Caustic | water |
|---|---|---|---|---|---|---|
| Ca(OH)$_2$ + | Na$_2$SO$_4$ + | 2H$_2$O | = | CaSO$_4$ (H$_2$O)$_2$ | + 2 NaOH | + H$_2$O |

The reaction of lime with the sodium sulfate solution in effect regenerates the sodium hydroxide solution so that it can be re-used in FGS processes. The gypsum formed in the reaction is much less soluble than NaOH and can be effectively separated from the solution by crystallizing the gypsum and removing as a solid product.

Research has indicated that the above reaction reaches equilibrium after approximately 10% of the sodium sulfate is converted to the reaction products. The present invention uses of membranes to separate the NaOH from sodium sulfate so that the sodium sulfate can be recycled to the reaction vessel for further conversion to NaOH. This sulfate separation and recycling allows nearly complete reaction of sodium sulfate to reaction products.

The regeneration crystallization process can be accomplished using well-established reaction, crystallization, and filtering techniques using commonly manufactured equipment.

Broadly, the method of the present invention comprises the steps of:
(a) receiving an influent flow of the purge liquid from a flue gas scrubber that removes sulfur dioxide from a waste gas screen;
(b) adding lime to the influent flow of the purge liquid so as to react a portion of the sodium sulfate therein to gypsum and caustic soda;
(c) collecting the gypsum as a solid from the purged liquid;
(d) extracting the caustic soda as a solution from the purge liquid;
(e) returning a remainder portion of the purged liquid from which the gypsum and caustic soda have been removed to the influent flow of the purged liquid; and
(f) supplying the caustic soda solution to the flue gas scrubber for use in removing sulfur dioxide from the waste gas stream.

The step of extracting the caustic soda solution from the purged liquid solution may comprise the step of passing the purged liquid over a sulfate membrane that preferentially rejects sulfate ions in the purged liquid and that allows the caustic soda solution to pass therethrough.

The step of collecting the solid gypsum from the purged liquid may comprise the steps of precipitating the gypsum as a particulate from the purged liquid, and filtering the particulate gypsum to obtain the solid gypsum. The step of precipitating the gypsum as a particulate may comprise crystallizing the particulate gypsum in a reactor vessel, and separating the particulate gypsum from a clear component of the purged liquid in a thickener.

The step of adding the lime to the influent flow of the purged liquid may comprise adding an aqueous lime slurry to the influent flow on an upstream side of the reactor vessel. The step of filter the particulate gypsum may comprise filtering the particulate gypsum following separation in the thickener.

The step of adding the lime to the influent flow of the purged liquid may comprise adding the lime in an amount sufficient to yield from about 5% to about 30% by weight of said sodium sulfate in said purged liquid as gypsum. In a preferred embodiment, the step of adding the lime may comprise adding the lime in an amount sufficient to yield about 10% by weight of the sodium sulfate in the purged liquid as gypsum.

The method may further comprise the step of withdrawing water from the influent flow of the purged liquid so as to increase a concentration of sodium sulfate therein prior to adding the lime to the purged liquid. The step of withdrawing water from the influent flow of the purged liquid may comprise the step of passing the influent flow over a reverse osmosis membrane that permits water to pass therethrough out of the purged liquid. The step of withdrawing water from the influent flow may comprise withdrawing water in an amount sufficient to concentrate the sodium sulfate to from about 15% to about 30% by weight of the purged liquid.

The step of supplying the caustic soda solution to the flue gas scrubber may comprise passing the extracted caustic soda solution over a reverse osmosis membrane so as to increase a concentration of caustic soda in the solution. The step of passing the extracted caustic soda solution over the reverse osmosis membrane may comprise removing water in an amount sufficient to concentrate the caustic soda to from about 5% to about 25% by weight of said solution.

The present invention also provides an apparatus for regeneration of caustic soda from a flue gas purged liquid containing sodium sulfate. The apparatus may comprise:

(a) means for receiving an influent flow of the purged liquid from a flue gas scrubber that removes sulfur dioxide from a waste gas stream;

(b) a reverse osmosis membrane over which the influent flow of purged liquid is passed so as to increase concentration of sodium sulfate in the purged liquid by removing water therefrom;

(c) means for adding lime to the influent flow having the increased concentration of sodium sulfate, so that the lime will react a portion of the sodium sulfate in the purged liquid to gypsum and caustic soda;

(d) a reactor vessel for receiving the purged liquid and lime so that particulate gypsum forms therein;

(e) a thickener for separating a particulate gypsum from a substantially clear component of the purged liquid;

(f) means for filtering the particulate gypsum separated from the clear component of the purged liquid so as to form a solid gypsum product;

(g) a sulfate membrane over which the clear component of the purged liquid is passed, the sulfate membrane preferentially permitting the caustic soda solution to pass therethrough so as to be extracted from the clear component of the purged liquid and so that unreacted sodium sulfate is left in a remainder component thereof;

(h) means for returning the remainder component of the purged liquid having the unreacted sodium sulfate therein to the influent flow of the purged liquid;

(i) a reverse osmosis membrane over which the caustic soda solution extracted from the purged liquid is passed so as to increase a concentration of the caustic soda in the solution by removing water therefrom; and (j) means for providing the concentrated caustic soda solution to the flue gas scrubber for use in removing sulfur dioxide from the waste gas flow.

These and other features and advantages of the present invention will be more fully understood from a reading of the following detailed description with reference to the accompanying drawings.

DETAILED DESCRIPTION

Figure 1:
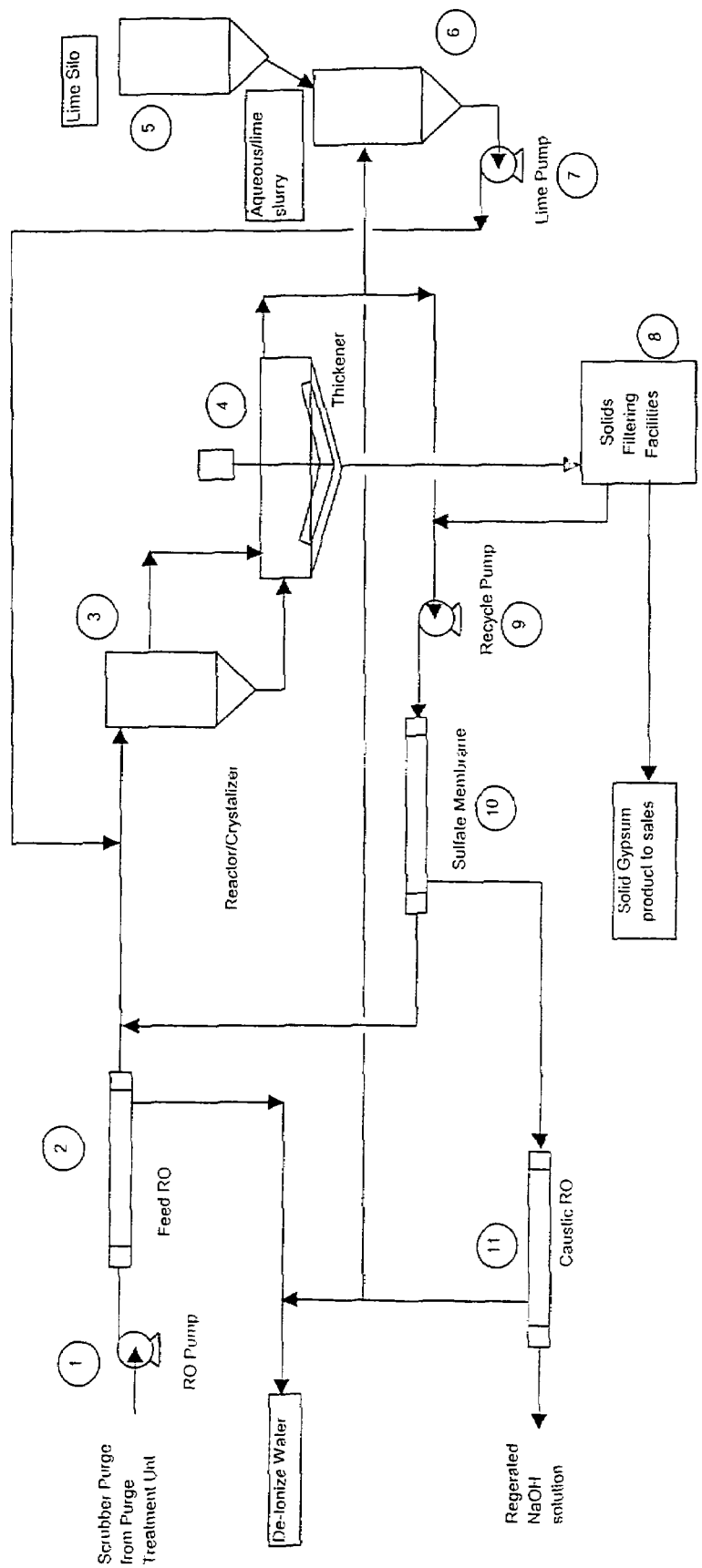
FIG. 1 is a schematic view of a caustic regeneration process in accordance with one embodiment of the present invention.

Reference will now be made to FIG. 1 which provides a schematic representation of one preferred process to regenerate flue gas scrubber (FGS) purge solution into caustic and gypsum products.

Generally, the FGS purge solution will first be treated in a Purge Treatment Unit (PTU), where contact with air reduces the chemical oxygen demand (COD) by converting sulfite compounds into the sulfate compound. A typical PTU effluent will have an approximate composition of 95 wt % water, 4-5 wt % sodium sulfate and concentrations of less than 0.5 wt % of sodium sulfite and sodium bisulfite. The charge pump for the present invention process is the RO pump 1. Pump 1 transfers the feed solution from the previous process or from a storage tank to the reverse osmosis (RO) membrane 2. Sufficient pressure, e.g., between 200 and 400 psig, is supplied by pump 1 to force excess water through membrane 2 and concentrate the feed solution to improve recovery per pass through the downstream process components. Sodium sulfate salt will generally be concentrated to 15 to 25% on a weight basis, as limited by membrane design and solubility of sodium sulfate. Membrane 1 may be a commonly available reverse osmosis membrane, such as a GE Osmonics A-series thin film membrane. A possible variation of this part of the process is that the feed solution could be concentrated by equipment 1 and 2 within the refinery or processing facility, and the concentrated solution then shipped to a centralized regeneration facility.

Concentrated solution from membrane 2 flows into the reactor/crystallizer 3. Lime slurry is premixed with the feed solution and recycle solution before the mix is charged to vessel 3. Vessel 3 is suitably a mixed reactor, for example, of a draft tube design. The feed nozzle and reactor are preferably designed so that the lime and feed/recycle must circulate though the reactor and cannot short circuit to the outlet nozzle. Lime slurry flow will generally be controlled to provide sufficient lime for 5%-30% yield of gypsum (versus complete conversion of sodium sulfate to gypsum), and preferably about 10% corresponding in a stoichiometric fashion to the equilibrium conversion per pass that is achieved, which is expected to be about 10%.

Gypsum that is formed when sodium sulfate reacts with lime following the formula

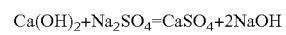

$$Ca(OH)_2 + Na_2SO_4 = CaSO_4 + 2NaOH$$

is much less soluble than the feed salt and will precipitate out of solution. NaOH that is formed is highly soluble in water and will remain in solution.

Mix rate and reactor design ensures that gypsum particle size is large enough to be easily separated from liquid and be recovered as solid product. Reactor liquid product is drawn off the reactor, 3, and routed to a thickener 4. Sufficiently large particles settle to the bottom of the 3 and are drawn off as a slurry and also routed to the thickener 4.

Thickener 4 separates the liquid reactor product and gypsum solid mixture into a clear liquid relatively free of solids and a dense slurry of gypsum solid, the latter including enough liquid to allow transport of the solid to the filtering facilities 8. Thickener 4 has sufficient residence time to allow all but the smallest solid particles to settle out by gravity. A slow rotating rake prevents solids from packing on the bottom allowing them to flow out of 4 as a thick slurry. The thickener may suitably be similar to existing models available from West Pro Machinery of Vernan, BC.

Solids slurried out of thickener 4 flow to the filtering facilities 8. In the illustrated embodiment, the filtering facility 8 produces a low liquid content filter cake, generated by a plate and frame type filter press that presses excess liquid out of the solid. Liquid is recovered and returned to the process. The solid gypsum product is removed from the press and stored for future shipment.

Liquids from equipment 4 and 8 mix together and are pumped by recycle pump 9 to sulfate membrane 10. Pump 9 increases the liquid pressure to a level sufficient to obtain reasonable flux of solution through membrane 10, e.g., from 200 to 400 psig. In membrane 10 water and the mono-valent sodium ion pass though the membrane to become a permeate solution containing NaOH. The liquid solution which does not pass through the membrane becomes a concentrate product of water and predominately sodium sulfate. The sulfate ion is multi-valent and is preferentially rejected by the membrane. The membrane element will be one of several nano-filtration elements that have been produced by several manufactures. One suitable membrane element is the DK thin film membrane spiral wound element manufactured by GE Osmonics.

Permeate solution product from membrane 10 pressures or is pumped by an additional pump to the caustic RO membrane, 11. Water is pressured though this reverse osmosis membrane with the permeate product becoming de-ionized water. NaOH caustic is concentrated in the stream that does not flow through the membrane and becomes the final regenerated NaOH caustic product of the process, which is sent back for re-use in the FGS, e.g., via a pipe or other conduit. NaOH concentration in the solution is expected to be in the range of 5-25 wt %. The membrane used for this service may suitably be a reverse osmosis membrane such as an A-Series thin film membrane manufactured by GE Osmonics.

Equipment 5, 6, and 7 comprise the lime delivery system in one embodiment of the present invention. Lime silo 5 is used to take delivery of and store lime (Ca(OH)2) for use in the process. Lime from 5 flows by gravity or is conveyed into lime slurry tank 6. A mixer in 6 mixes lime and water to produce a lime slurry that is suitably about 10 wt % lime. Lime slurry flows out the bottom nozzle of 6 to the suction of lime pump 7, which pumps the lime slurry to the feed to reactor/crystallizer 3.

Thus, specific embodiments and applications of caustic regeneration systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. Descriptions of process steps and equipment of the subject invention should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method for regeneration of caustic soda from a flue gas purge liquid containing sodium sulfate, said method comprising the steps of:

receiving an influent flow of said purge liquid from a flue gas scrubber that removes sulfur dioxide from a waste gas stream;

adding lime to said influent flow of said purge liquid so as to react a portion of said sodium sulfate therein to gypsum and caustic soda;

collecting said gypsum as a solid from said purge liquid;

extracting said caustic soda as a solution from said purge liquid;

returning a remainder portion of said purge liquid from which said gypsum and caustic soda have been removed to said influent flow of said purge; and supplying said caustic soda solution to said flue gas scrubber for use in removing sulfur dioxide from said waste gas stream.

2. The method of claim 1, wherein the step of extracting said caustic soda solution from said purge liquid comprises the step of:

passing said purge liquid over a sulfate membrane that preferentially rejects sulfate ions in said purge liquid and that allows said caustic soda solution to pass therethrough.

3. The method of claim 2, wherein the step of collecting said solid gypsum from said purge liquid comprises the steps of:

precipitating said gypsum as a particulate from said purge liquid; and filtering said particulate gypsum to obtain said solid gypsum.

4. The method of claim 3, wherein the step of precipitating said gypsum as a particulate comprises:

crystallizing said particulate gypsum in a reactor vessel; and separating said particulate gypsum from a clear component of said purge liquid in a thickener.

5. The method of claim 4, wherein the step of adding said lime to said influent flow of said purge liquid comprises:

adding an aqueous lime slurry to said influent flow on an upstream side of said reactor vessel.

6. The method of claim 4, wherein the step of filtering said particulate gypsum comprises:

filtering said particulate gypsum following separation in said thickener.

7. The method of claim 3, wherein the step of adding said lime to said influent flow of said purge liquid comprises:

adding said lime in an amount sufficient to yield from about 5% to about 30% by weight of said sodium sulfate in said purge liquid as gypsum.

8. The method of claim 7, wherein the step of adding said lime comprises:

adding said lime in an amount sufficient to yield about 10% by weight of said sodium sulfate in said purge liquid as gypsum.

9. The method of claim 7, further comprising the steps of:
withdrawing water from said influent flow of said purge liquid so as to increase a concentration of sodium sulfate therein prior to adding said lime to said purge liquid.

10. The method of claim 9, wherein the step of withdrawing water from said influent flow of said purge liquid comprises the step of:
passing said influent flow over a reverse osmosis membrane that permits water to pass therethrough out of said purge liquid.

11. The method of claim 9, wherein the step of withdrawing water from said influent flow of said purge liquid comprises:
withdrawing water from said influent flow in an amount sufficient to concentrate said sodium sulfate to from about 15% to about 30% by weight of said purge liquid.

12. The method of claim 2, wherein the step of supplying said caustic soda solution to said flue gas scrubber comprises:
passing said extracted caustic soda solution over a reverse osmosis membrane so as to increase a concentration of caustic soda in said solution.

13. The method of claim 12, wherein the step of passing said extracted caustic soda solution over said reverse osmosis membrane comprises:
passing said extracted caustic soda solution over said reverse osmosis membrane so as to remove water in an amount sufficient to concentrate said caustic soda to from about 5% to about 25% by weight of said solution.

14. A method for regeneration of caustic soda from a flue gas purge liquid containing sodium sulfate, said method comprising the steps of:
receiving an influent flow of said purge liquid from a flue gas scrubber that removes sulfur dioxide from a waste gas stream;
passing said influent flow over a reverse osmosis membrane so as to increase a concentration of sodium sulfate in said purge liquid;
adding an aqueous lime slurry to said purge liquid having said increased concentration of sodium sulfate therein, in an amount sufficient to yield from about 5% to about 30% by weight of said sodium sulfate as gypsum;
crystallizing said gypsum in a reactor vessel so as to form particulate gypsum that precipitates from said purge liquid;
thickening said particulate gypsum so as to separate said particulate gypsum from a substantially clear component of said purge liquid;
filtering said separated particulate gypsum so as to form a solid gypsum product;
passing said substantially clear component of said purge liquid over a sulfate membrane that permits caustic soda from said clear component to pass therethrough so as to be extracted from said purge liquid, leaving a remainder component of said purge liquid that contains unreacted sodium sulfate;
returning said remainder component of said purge liquid to said influent flow of said purge liquid;
passing said caustic soda solution extracted from said purge liquid over a reverse osmosis membrane so as to concentrate said caustic soda in said solution by removing water therefrom; and
providing said concentrated caustic soda solution back to said flue gas scrubber for use in removing sulfur dioxide from said waste gas flow.

15. The method of claim 14, wherein the step of adding aqueous lime slurry to said purge liquid comprises:
adding said aqueous lime slurry in an amount sufficient to yield about 10% by weight of said sodium sulfate in said purge liquid as a gypsum.

16. The method of claim 14, wherein the step of passing said influent flow of said purge liquid over said reverse osmosis membrane comprises:
passing said influent flow of said purge liquid over said reverse osmosis membrane so as to remove an amount of water sufficient to concentrate said sodium sulfate in said purge liquid to from about 15% to about 30% on a weight basis.

17. The method of claim 14, wherein the step of passing said caustic soda solution over said reverse osmosis filter comprises:
passing said caustic soda solution over said reverse osmosis filter so as to remove an amount of water sufficient to concentrate said caustic soda in said solution to about 5% to about 25% by weight.

* * * * *